US011211850B2

(12) United States Patent
Ito et al.

(10) Patent No.: US 11,211,850 B2
(45) Date of Patent: Dec. 28, 2021

(54) MOTOR

(71) Applicant: Nidec Corporation, Kyoto (JP)

(72) Inventors: Masaki Ito, Kyoto (JP); Shuji Hosoda, Kyoto (JP); Wataru Morisaki, Kyoto (JP); Norihide Watari, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 126 days.

(21) Appl. No.: 16/682,009

(22) Filed: Nov. 13, 2019

(65) Prior Publication Data

US 2020/0186009 A1    Jun. 11, 2020

(30) Foreign Application Priority Data

Dec. 5, 2018   (JP) .............................. JP2018-227997

(51) Int. Cl.
*H02K 11/215*   (2016.01)
*H02K 11/33*    (2016.01)
(Continued)

(52) U.S. Cl.
CPC ............ *H02K 11/215* (2016.01); *H02K 3/50* (2013.01); *H02K 11/0094* (2013.01); *H02K 11/33* (2016.01); *H02K 2211/03* (2013.01)

(58) Field of Classification Search
CPC ........ H02K 11/21; H02K 11/215; H02K 3/50; H02K 2211/03; H02K 11/0094;
(Continued)

(56) References Cited

U.S. PATENT DOCUMENTS 4,594,524 A * 6/1986 Sudo ...................... H02K 29/08
                                                          310/68 R
4,806,808 A * 2/1989 Grecksch ............... H02K 29/08
                                                          310/67 R
(Continued)

FOREIGN PATENT DOCUMENTS

JP    2016-058453 A       4/2016
JP    2016058453 A    *  4/2016
JP    2018-014437 A       1/2018

OTHER PUBLICATIONS

Oya et al., Wiring Board Motor Electrical Apparatus and Air Conditioner, Apr. 21, 2016, Mitsubishi Electric, JP 2016058453 (English Machine Translation) (Year: 2016).*

*Primary Examiner* — Quyen P Leung
*Assistant Examiner* — Alexander A Singh
(74) *Attorney, Agent, or Firm* — Keating & Bennett

(57) ABSTRACT

A motor includes a stationary portion including an annular stator centered on a central axis extending in a vertical direction, and a rotating portion including a magnet radially opposite to the stator, and rotatable about the central axis. The stationary portion includes a circuit board axially below the magnet and an electronic component mounted on the circuit board, the circuit board includes a board hole passing therethrough in an axial direction. The electronic component includes a component body portion including at least a portion thereof in the board hole, a first terminal portion extending in a first direction from the component body portion, the first direction being not parallel to the axial direction, a second terminal portion extending downward from the first terminal portion, and a third terminal portion extending from the second terminal portion, and joined to the circuit board through solder.

8 Claims, 6 Drawing Sheets

(51) Int. Cl.
*H02K 3/50* (2006.01)
*H02K 11/00* (2016.01)

(58) Field of Classification Search
CPC .......... H02K 3/38; H02K 11/33; H02K 11/30; H02K 5/225; H02K 5/22; H02K 11/0073; H02K 3/522; G11B 19/2045
USPC ....................................................... 310/68 B
See application file for complete search history.

(56) References Cited

U.S. PATENT DOCUMENTS

| | | | |
|---|---|---|---|
| 2007/0194668 A1* | 8/2007 | Teshima | F04D 25/0613 310/67 R |
| 2008/0218011 A1* | 9/2008 | Cosco | H05K 1/0259 310/71 |
| 2010/0303647 A1 | 12/2010 | Ida et al. | |
| 2018/0254686 A1* | 9/2018 | Komasaki | H01L 27/22 |

\* cited by examiner

MOTOR

CROSS REFERENCE TO RELATED APPLICATION

The present application claims priority under 35 U.S.C. § 119 to Japanese Application No. 2018-227997 filed on Dec. 5, 2018, the entire contents of which are hereby incorporated herein by reference.

1. FIELD OF THE INVENTION

The present disclosure relates to a motor.

2. BACKGROUND

A known electronic module typically includes a board and a component mounted on the board. The component includes a body portion including an electronic circuit, and terminals electrically connected to the electronic circuit of the body portion. The board includes metal pads electrically connected to the terminals through a solder. The board includes a hole in which the body portion of the component is to be fitted. Each metal pad is formed from a position a specific distance away from the hole. The solder is applied onto the metal pad and over a specific region extending from the metal pad toward the body portion between the metal pad and the body portion.

In the known electronic module, each terminal is arranged to extend straight from the body portion toward the corresponding metal pad. The electronic circuit included in the body portion of the component is arranged at a level close to that of a surface of the board on which the metal pads are arranged.

In the case where the configuration of the known electronic module is applied to a motor, the distance between a magnet and the electronic circuit included in the body portion of the component tends to easily become large when the magnet is arranged on an opposite side of the board with respect to the surface on which the metal pads are arranged. When the electronic circuit is far from the magnet, the component may not be able to properly sense the magnetism of the magnet, for example.

SUMMARY

A motor according to an example embodiment of the present disclosure includes a stationary portion including an annular stator centered on a central axis extending in a vertical direction, and a rotating portion including a magnet radially opposite to the stator, and being rotatable about the central axis. The stationary portion includes a circuit board axially below the magnet and an electronic component mounted on the circuit board, the circuit board including a board hole passing therethrough in an axial direction. The electronic component includes a component body portion including at least a portion thereof located in the board hole, a first terminal portion extending in a first direction from the component body portion, the first direction being not parallel to the axial direction, a second terminal portion extending downward from the first terminal portion, and a third terminal portion extending in the first direction from the second terminal portion, and joined to a lower surface of the circuit board through solder.

The above and other elements, features, steps, characteristics and advantages of the present disclosure will become more apparent from the following detailed description of the example embodiments with reference to the attached drawings.

DETAILED DESCRIPTION

Figure 1:
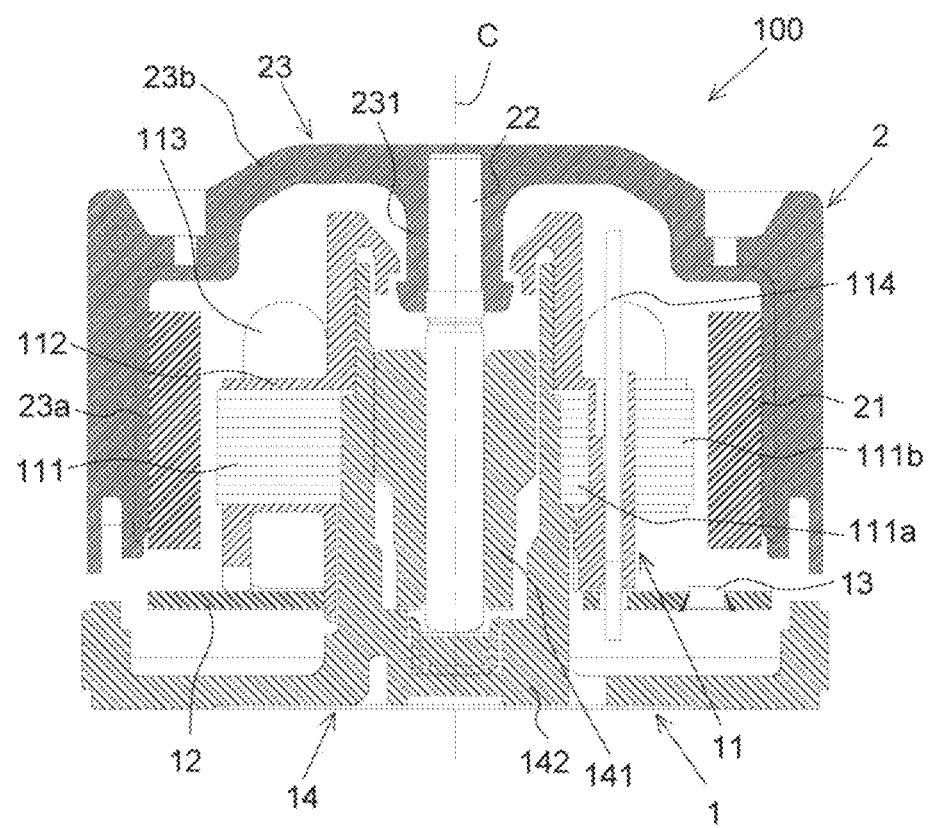
FIG. 1 is a vertical sectional view of a motor according to an example embodiment of the present disclosure.

Hereinafter, example embodiments of the present disclosure will be described in detail with reference to the accompanying drawings. It is assumed herein that a direction parallel to a central axis C of a motor 100 illustrated in FIG. 1 is referred to by the term "axial direction", "axial", or "axially", that directions perpendicular to the central axis C are each referred to by the term "radial direction", "radial", or "radially", and that a direction along a circular arc centered on the central axis C is referred to by the term "circumferential direction", "circumferential", or "circumferentially". It is also assumed herein that an axial direction is a vertical direction, and that a side on which a magnet 21 is arranged with respect to a circuit board 12 is defined as an upper side. The shape of each member or portion and relative positions of different members or portions will be described based on the above assumptions. It should be noted, however, that the above definitions of the vertical direction and the upper side are not meant to restrict in any way the orientation of a motor according to any example embodiment of the present disclosure when in use.

It is also assumed herein that the term "first direction" includes a direction perpendicular to the axial direction, and a direction slightly angled in the axial direction with respect to the direction perpendicular to the axial direction. The term "second direction" refers to a direction perpendicular to both the first direction and the axial direction. In the accompanying drawings, the direction indicated by arrow X is the first direction, while the direction indicated by arrow Y is the second direction.

FIG. 1 is a vertical sectional view of a motor 100 according to an example embodiment of the present disclosure. As illustrated in FIG. 1, the motor 100 includes a stationary portion 1 and a rotating portion 2.

The stationary portion 1 includes an annular stator 11, a circuit board 12, and an electronic component 13. The stationary portion 1 further includes a bearing portion 14.

The annular stator 11 is centered on a central axis C extending in the vertical direction. The stator 11 is an armature arranged to generate magnetic flux in accordance with electric drive currents. The stator 11 includes a stator core 111, an insulator 112, and coils 113.

The stator core 111 is a magnetic body. The stator core 111 is defined by, for example, laminated electromagnetic steel sheets. The stator core 111 includes an annular core back 111a and a plurality of teeth 111b. The annular core back 111a is centered on the central axis C. The teeth 111b are arranged to project radially outward from the core back 111a. The teeth 111b are arranged in a circumferential direction about the central axis C while being spaced from one another in the circumferential direction. In the present example embodiment, the teeth 111b are arranged at regular intervals in the circumferential direction.

The insulator 112 is arranged to cover at least a portion of the stator core 111. The insulator 112 is an insulating body. The insulator 112 is made of, for example, a resin. Terminal pins 114 are fixed to the insulator 112. Each terminal pin 114 is arranged to extend in the axial direction. The terminal pin 114 is made of, for example, a metal.

Each coil 113 is defined by a conducting wire wound around a separate one of the teeth 111b with the insulator 112 therebetween. The number of coils 113 included in the stator 11 is more than one. To each terminal pin 114, an end portion of a corresponding one of the conducting wires defining the coils 113 is connected. The terminal pin 114 is electrically connected to the corresponding coils 113.

The circuit board 12 is arranged axially below the stator core 111. The circuit board 12 may be in any of a variety of shapes. The circuit board 12 is defined in the shape of, for example, a circle, a rectangle, or the like. The circuit board 12 is connected to a lead wire used to supply power from a power supply. The circuit board 12 is electrically connected to each terminal pin 114 through, for example, a solder. That is, electric currents are supplied from the power supply to the coils 113 through the circuit board 12. The circuit board 12 will be described in detail below.

The electronic component 13 is mounted on the circuit board 12. In the present example embodiment, the electronic component 13 is a sensor-type component. Specifically, the electronic component is a Hall element. The electronic component may alternatively be any other desired component, such as, for example, a Hall IC or the like. The electronic component 13 will be described in detail below.

The bearing portion 14 is arranged to rotatably support a shaft 22, which will be described below. The bearing portion 14 includes a sleeve bearing 141 and a bearing housing 142. The sleeve bearing 141 is, for example, a sintered body obtained by sintering metal powder. The sleeve bearing 141 is tubular, and is centered on the central axis C. The bearing housing 142 is arranged radially outside of the sleeve bearing 141. The bearing housing 142 includes a tubular portion centered on the central axis C. The sleeve bearing 141 is arranged radially inside of the bearing housing 142, and is fixed to the bearing housing 142. The sleeve bearing 141 is, for example, fixed to an inner circumferential surface of the bearing housing 142 through press fitting. The bearing portion 14 may include a bearing different from the sleeve bearing 141. The bearing portion 14 may include, for example, a ball bearing in place of the sleeve bearing 141.

The stator 11 is arranged radially outside of the bearing housing 142. The stator 11 is fixed to the bearing housing 142.

The rotating portion 2 is arranged to rotate about the central axis C. The rotating portion 2 includes a magnet 21. The rotating portion 2 further includes the shaft 22 and a rotor holder 23.

The magnet 21 is arranged radially opposite to the stator 11. In the present example embodiment, the magnet 21 is arranged radially outside of the stator 11. The magnet 21 is annular, and is centered on the central axis C. Note that the magnet 21 may alternatively be defined by a plurality of magnet pieces arranged in the circumferential direction.

The shaft 22 is a tubular member arranged to extend in the axial direction with the central axis C in a center. The shaft 22 is arranged radially inside of the sleeve bearing 141. The shaft 22 is rotatably supported by the sleeve bearing 141.

The rotor holder 23 is arranged to support the magnet 21 and rotate together with the shaft 22. The rotor holder 23 is in the shape of a covered tube, and is arranged to open downward. The annular magnet 21 is fixed to an inner circumferential surface of the rotor holder 23. The rotor holder 23 includes, at a central portion of an upper surface thereof, a tubular projecting portion 231 arranged to extend downward. The tubular projecting portion 231 is centered on the central axis C. An upper end portion of the shaft 22 is inserted in the tubular projecting portion 231, and is fixed to the rotor holder 23. Thus, the shaft 22 and the rotor holder 23 are capable of rotating about the central axis C in one body.

In more detail, the rotor holder 23 has a two-layer structure, and includes a tubular metal member 23a and a resin member 23b in the shape of a covered tube and arranged to cover the tubular metal member 23a. The magnet 21 is fixed to an inner circumferential surface of the tubular metal member 23a. The tubular metal member 23a functions as a yoke for the magnet 21. The tubular projecting portion 231 is defined in the resin member 23b. Note that the rotor holder 23 may alternatively have another structure. For example, the rotor holder 23 may alternatively be defined by only a metal member in the shape of a covered tube. In this case, the shaft 22 may, for example, be coupled to the rotor holder 23 through a bushing inserted in an opening passing through an upper wall of the rotor holder 23 in the axial direction.

As a result of supply of the electric drive currents to the stator 11, a rotary torque is generated between the stator 11 and the magnet 21. Thus, the rotor holder 23 is caused to rotate with respect to the stator 11. The rotor holder 23 is arranged to rotate about the central axis C together with the shaft 22. In the present example embodiment, the motor 100 is a so-called outer-rotor motor. Note that the motor 100 may alternatively be an inner-rotor motor in which the magnet 21 is arranged radially inside of the stator 11.

Figure 2:
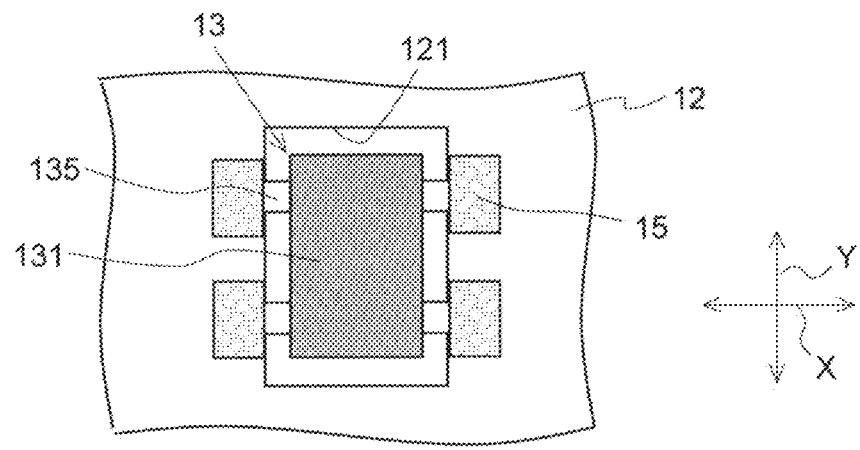
FIG. 2 is a schematic plan view illustrating an electronic component of a motor according to an example embodiment of the present disclosure and its vicinity in an enlarged form.
Figure 3:
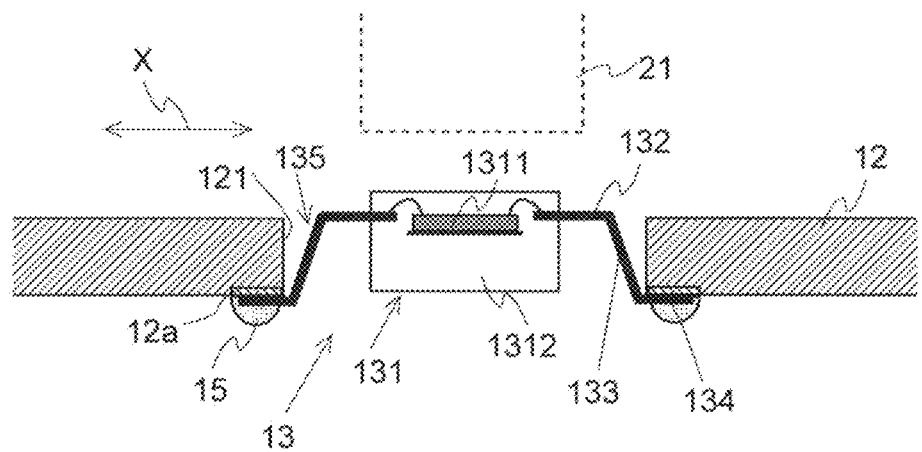
FIG. 3 is a schematic sectional view of an electronic component of the motor according to an example embodiment of the present disclosure and its vicinity.

FIG. 2 is a schematic plan view illustrating the electronic component 13 of the motor 100 according to an example embodiment of the present disclosure and its vicinity in an enlarged form. FIG. 2 is a planar view of the circuit board 12 when viewed from below in the axial direction. FIG. 3 is a schematic sectional view of the electronic component 13 of the motor 100 according to an example embodiment of the present disclosure and its vicinity. In FIG. 3, the magnet 21 is represented by a broken line to clearly illustrate the relationship between the electronic component 13 and the magnet 21. As illustrated in FIG. 3, the circuit board 12 is arranged axially below the magnet 21. The electronic component 13 is arranged axially under the magnet 21.

The circuit board 12 is a single-sided mounted board, having a wiring pattern on a lower surface thereof. The lead wire used to supply power from the power supply is connected to the lower surface of the circuit board 12. The circuit board 12 includes, in the lower surface thereof, lands 12a used when the electronic component 13 is mounted thereon. In the present example embodiment, each land 12a is defined by an exposed portion of a copper foil used for the mounting of the electronic component 13. When the circuit board 12 is a single-sided mounted board, the circuit board 12 can be defined by, for example, a paper phenolic board, and the motor 100 can be manufactured at a relatively low cost.

As illustrated in FIGS. 2 and 3, the circuit board 12 includes a board hole 121 arranged to pass therethrough in the axial direction. In the present example embodiment, the board hole 121 is rectangular in a plan view, when viewed in the axial direction. The board hole 121 may alternatively be in another shape, such as, for example, an ellipse. The board hole 121 is arranged axially under the magnet 21. At least a portion of the board hole 121 is preferably arranged axially opposite to the magnet 21.

As illustrated in FIGS. 2 and 3, the electronic component 13 includes a component body portion 131, first terminal portions 132, second terminal portions 133, and third terminal portions 134. In the present example embodiment, the electronic component 13 is a small-outline (SO) semiconductor package having gull-wing terminals 135 arranged to extend from two side surfaces of the component body portion 131. Each terminal 135 is defined by a single monolithic member including the first terminal portion 132, the second terminal portion 133, and the third terminal portion 134. The first terminal portion 132, the second terminal portion 133, and the third terminal portion 134 together define a single metal member. Examples of SO semiconductor packages include a small-outline package (SOP), a small-outline integrated circuit (SOIC), a mini/micro SOP (MSOP), and a quarter SOP (QSOP).

At least a portion of the component body portion 131 is arranged in the board hole 121. In the present example embodiment, the component body portion 131 is rectangular in a plan view, when viewed in the axial direction. The component body portion 131 is arranged to have a size smaller than that of the board hole 121 in the plan view, when viewed in the axial direction. Accordingly, the component body portion 131 can be inserted into the board hole 121 in the axial direction. In the present example embodiment, a portion of the component body portion 131 is arranged in the board hole 121. An upper surface of the component body portion 131 is arranged to protrude above an upper surface of the circuit board 12. The extent of this protrusion is preferably small. The extent of this protrusion is preferably equal to or smaller than a half of the axial thickness of the component body portion 131.

The component body portion 131 includes a sensor portion 1311 and a resin portion 1312. The resin portion 1312 is arranged to cover the sensor portion 1311. In the present example embodiment, the sensor portion 1311 includes a semiconductor film arranged to sense a magnetic field using a Hall effect. The semiconductor film is made of, for example, InSb, InAs, GaAs, or the like. In the present example embodiment, the sensor portion 1311 can be arranged close to the magnet 21 as described below, and this makes it possible to accurately sense the position of the rotating magnet 21.

The first terminal portion 132 is arranged to extend in the first direction, which is a direction not parallel to the axial direction, from the component body portion 131. Hereinafter, a side closer to the component body portion 131 in the first direction is referred to as an inner side in the first direction. A side opposite to the inner side in the first direction is referred to as an outer side in the first direction. The first terminal portion 132 is arranged to extend to the outer side in the first direction from a side surface of the component body portion 131. In the example illustrated in FIG. 3, the first direction is a direction perpendicular to the axial direction.

The second terminal portion 133 is arranged to extend downward from the first terminal portion 132. In the present example embodiment, the second terminal portion 133 is arranged to extend downward at an angle to the axial direction. The second terminal portion 133 is arranged to extend to the outer side in the first direction while extending downward. Note that the second terminal portion 133 may alternatively be arranged to extend, for example, vertically downward in the axial direction.

The third terminal portion 134 is arranged to extend in the first direction from the second terminal portion 133. In more detail, the third terminal portion 134 is arranged to extend to the outer side in the first direction from the second terminal portion 133. An upper surface of the third terminal portion 134 is arranged opposite to the corresponding land 12a. The third terminal portion 134 is joined to the lower surface of the circuit board 12 through a solder 15. That is, the electronic component 13 is electrically connected to the circuit board 12. In more detail, the third terminal portion 134 is joined to the corresponding land 12a defined in the lower surface of the circuit board 12 through the solder 15.

As illustrated in FIG. 2, in the present example embodiment, two of the terminals 135 are arranged on an end surface of the component body portion 131 on one side in the first direction, while two of the terminals 135 are arranged on an end surface of the component body portion 131 on an opposite side in the first direction. The electronic component 13 has a total of four terminals 135. The two terminals 135 arranged on each of the above end surfaces are spaced apart from each other in the second direction. The two terminals 135 arranged on the end surface on the one side in the first direction and the two terminals 135 arranged on the end surface on the opposite side in the first direction are arranged symmetrically with respect to a bisector that extends along the second direction and divides the electronic component 13 into two equal parts.

Note that the number of terminals 135 included in the electronic component 13 and the arrangement of the terminals 135 may be different from those described above. For example, four of the terminals 135 may be arranged on both the end surface of the component body portion 131 on the one side in the first direction and the end surface of the component body portion 131 on the opposite side in the first direction. For example, three of the terminals 135 may be arranged on both the end surface of the component body portion 131 on the one side in the first direction and the end surface of the component body portion 131 on the opposite side in the first direction. Also note that the end surface of the component body portion 131 on the one side in the first direction and the end surface of the component body portion 131 on the opposite side in the first direction may have mutually different numbers of terminals 135 arranged thereon. For example, two of the terminals 135 and one of the terminals 135 may be arranged on the end surface on the one side in the first direction and the end surface on the opposite side in the first direction, respectively.

The electronic component 13 is mounted on the circuit board 12 in the following procedure, for example. First, the circuit board 12 is placed in such a manner that the surface thereof in which the lands 12a are defined faces upward, and a cream solder is applied to each land 12a. Although the cream solder applied may protrude from the land 12a, it is preferable that the cream solder applied does not significantly protrude from the land 12a, in order to prevent a portion of the cream solder which protrudes from the land 12a from being left as an extraneous body, such as, for example, a solder ball, without condensing.

Next, the electronic component 13 is oriented such that the first terminal portion 132 and the third terminal portion 134 lie on the lower side and the upper side, respectively, and the component body portion 131 is inserted into the board hole 121. At this time, the third terminal portion 134 is pressed against the corresponding land 12a. Next, the circuit board 12 with the electronic component 13 arranged thereon is passed through a reflow oven. As a result, the cream solder once melts into a liquid state, and then hardens, so that each terminal 135 is soldered to the corresponding land 12a.

According to the present example embodiment, a reduction in the extent of protrusion of the electronic component 13 above the upper surface of the circuit board 12 can be achieved by arranging at least a portion of the component body portion 131 in the board hole 121. This allows the circuit board 12 to be arranged closer to the rotating portion 2, and leads to a reduced axial thickness of the motor 100. In addition, in the motor 100 according to the present example embodiment, the bent structure of each terminal 135 allows the sensor portion 1311 of the electronic component 13 to be arranged closer to the magnet 21 despite the terminals 135 of the electronic component 13 being soldered to the lower surface of the circuit board 12. This enables the sensor portion 1311 to appropriately sense the magnetism of the magnet 21.

Figure 4:
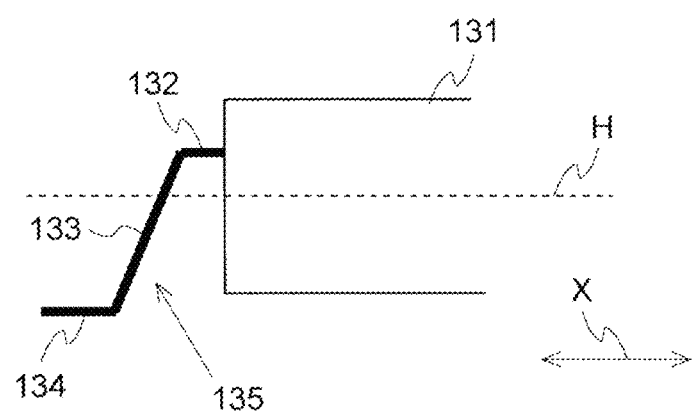
FIG. 4 is a schematic diagram that explains the structure of an electronic component of a motor according to an example embodiment of the present disclosure.

FIG. 4 is a schematic diagram for explaining the structure of the electronic component 13 of the motor 100 according to an example embodiment of the present disclosure. In an example embodiment of the present disclosure, the first terminal portion 132 is arranged to extend in the first direction from an axial middle position H of the component body portion 131, or a position axially above the axial middle position H. In the example embodiment illustrated in FIG. 4, the first terminal portion 132 is arranged to extend in the first direction from a position axially above the axial middle position H of the component body portion 131.

The sensor portion 1311 included in the component body portion 131 is arranged at an axial level close to that of the first terminal portion 132. Thus, the sensor portion 1311 can be arranged closer to the magnet 21 by arranging the axial level of the first terminal portion 132 to be equal to the axial middle position H or higher than the axial middle position H.

Figure 5:
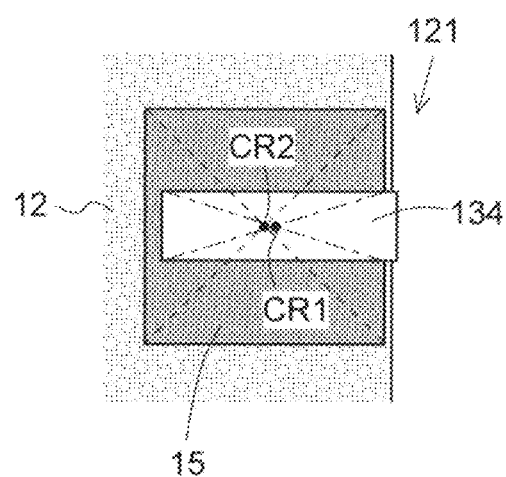
FIG. 5 is a schematic plan view illustrating the relationship between solder and a third terminal portion in a motor according to an example embodiment of the present disclosure.

FIG. 5 is a schematic plan view illustrating the relationship between the solder 15 and the third terminal portion 134 in the motor 100 according to an example embodiment of the present disclosure. FIG. 5 is a plan view illustrating a portion of the lower surface of the circuit board 12. In an example embodiment of the present disclosure, a central portion CR1 of a region over which the third terminal portion 134 is in contact with the solder 15 is arranged to coincide with a central portion CR2 of the solder 15, or is arranged in proximity to the central portion CR2 of the solder 15. In the example embodiment illustrated in FIG. 5, the central portion CR1 of the region over which the third terminal portion 134 is in contact with the solder is arranged in proximity to the central portion CR2 of the solder 15. In the example illustrated in FIG. 5, the region over which the third terminal portion 134 is in contact with the solder 15 is in the shape of a rectangle in a plan view, when viewed in the axial direction, and a point of intersection of two diagonals of the rectangle corresponds to the central portion CR1. Similarly, the solder 15 is in the shape of a rectangle in a plan view, when viewed in the axial direction, and a point of intersection of two diagonals of the rectangle corresponds to the central portion CR2.

In the present example embodiment, each land 12a is also in the shape of a rectangle. A central portion of the land 12a substantially coincides with the central portion CR2 of the solder 15. It is preferable that a central portion of a region over which the third terminal portion 134 coincides with the land 12a when viewed in the axial direction is arranged to coincide with the central portion of the land 12a, or is arranged in proximity to the central portion of the land 12a.

In the case where the central portion CR1 of the region over which the third terminal portion 134 is in contact with the solder 15 is significantly away from the central portion CR2 of the solder 15, the third terminal portion 134 may easily move due to surface tension when the solder has been melted. For example, in the case where the circuit board 12 is passed along the first direction in the reflow oven, the solder melts at different times on opposite sides of the electronic component 13 in the first direction. That is, the surface tension is applied at different times on opposite sides of the electronic component 13 in the first direction. As a result, the electronic component 13 may be lifted on one side of the electronic component 13 in the first direction. In the present example embodiment, however, the third terminal portion 134 does not easily move due to the surface tension at the time of reflow, because the two central portions CR1 and CR2 coincide with each other, or are arranged in proximity to each other. This contributes to preventing the aforementioned lift. This leads to appropriate mounting of the electronic component 13 on the circuit board 12.

In addition, in the case where the upper surface of the third terminal portion 134 is arranged opposite to the land 12a as in the present example embodiment, the weight of the component body portion 131 may be applied to the third terminal portion 134 with increased difficulty compared to the case where a lower surface of the third terminal portion 134 is arranged opposite to the land 12a. If this happens, the third terminal portion 134 may easily move due to the surface tension at the time of reflow. According to the present example embodiment, however, the likelihood that the third terminal portion 134 will move due to the surface tension at the time of reflow can be reduced, and thus, the electronic component 13 can be appropriately mounted on the circuit board 12.

Figure 6:
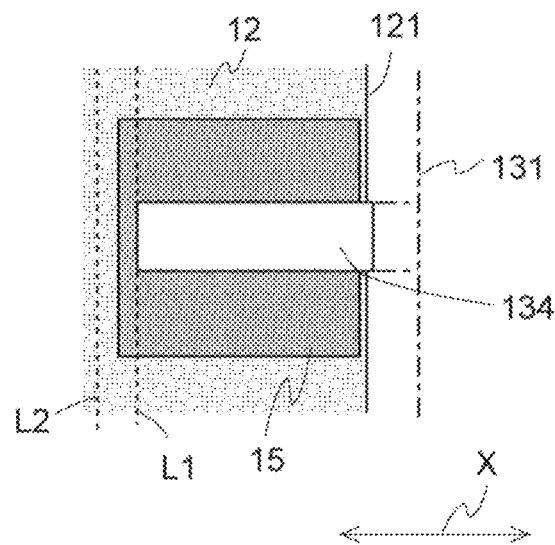
FIG. 6 is a schematic plan view illustrating the relationship between the solder and the third terminal portion in a motor according to an example embodiment of the present disclosure.

FIG. 6 is a schematic plan view illustrating the relationship between the solder 15 and the third terminal portion 134 in the motor 100 according to an example embodiment of the present disclosure. FIG. 6 is a plan view illustrating a portion of the lower surface of the circuit board 12. As illustrated in FIG. 6, at the lower surface of the circuit board 12, the third terminal portion 134 is arranged to extend from the inner side in the first direction, i.e., the side closer to the component body portion 131 in the first direction, to the outer side in the first direction, i.e., the side opposite to the inner side in the first direction.

At least a portion of an inner end of the solder 15 in the first direction is arranged to overlap with the third terminal portion 134 when viewed in the axial direction. As illustrated in FIG. 6, in the present example embodiment, a portion of the inner end of the solder 15 in the first direction is arranged to overlap with the third terminal portion 134 when viewed in the axial direction. The inner end of the solder 15 in the first direction is arranged on an edge of the board hole 121 or at a position a little away from the edge to the outer side in the first direction. At least a portion of an inner end of the land 12a in the first direction is arranged to overlap with the third terminal portion 134 when viewed in the axial direction. The inner end of the land 12a in the first direction is arranged on the edge of the board hole 121 or at a position a little away from the edge to the outer side in the first direction.

An outer end of the solder 15 in the first direction is preferably arranged at one of a first position L1, a second position L2, and a position between the first position L1 and the second position L2 in the first direction. In the example illustrated in FIG. 6, the outer end of the solder 15 in the first direction is arranged at a position between the first position L1 and the second position L2 in the first direction. The first position L1 is a position at which an outer end of the third terminal portion 134 in the first direction is arranged. The second position L2 is a position being a distance equal to twice the axial thickness of the third terminal portion 134 away from the first position L1 to the outer side in the first direction. An outer end of the land 12a in the first direction is preferably arranged at one of the first position L1, the second position L2, and a position between the first position L1 and the second position L2 in the first direction.

The above arrangements contribute to preventing the solder 15 from excessively protruding to the outer side in the first direction from the third terminal portion 134, and preventing the central portion CR2 of the solder 15 from being significantly displaced in the first direction from the central portion CR1 of the region over which the third terminal portion 134 is in contact with the solder 15. That is, the above arrangements contribute to preventing the third terminal portion 134 from moving due to the surface tension when the solder has been melted. In addition, the above arrangements contribute to preventing the dimension of the solder 15 measured in the first direction from becoming too small, and allow the third terminal portion 134 to be firmly fixed.

Figure 7:
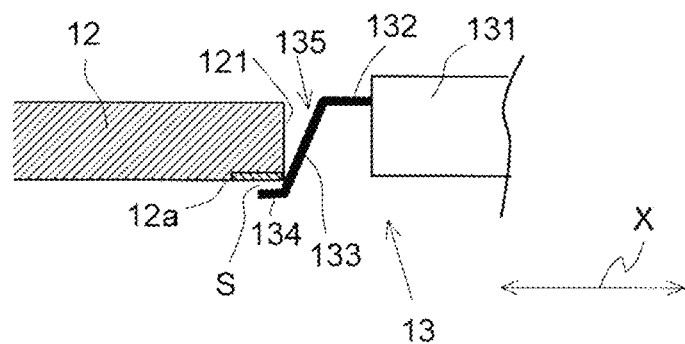
FIG. 7 is a schematic diagram illustrating the relationship between a terminal of an electronic component and a circuit board according to a modification of the above example embodiment of the present disclosure.

FIG. 7 is a schematic diagram illustrating the relationship between a terminal 135 of an electronic component 13 and a circuit board 12 according to a modification of the above example embodiment of the present disclosure. In the example illustrated in FIG. 7, a gap S is defined axially between a land 12a and an upper surface of a third terminal portion 134. The gap S is defined, for example, by a second terminal portion 133 being in contact with an edge of a board hole 121. Alternatively, the gap S may be defined, for example, by a direction in which the third terminal portion 134 extends from the second terminal portion 133 being angled axially downward with respect to directions perpendicular to the axial direction. Even in the case of this configuration, in which the gap S is defined, an outer end of a solder 15 in the first direction may be arranged at one of the first position L1, the second position L2, and a position between the first position L1 and the second position L2 in the first direction. In the case of this configuration, however, the range in which the outer end of the solder 15 in the first direction may be arranged may be modified with the gap S being taken into account. The second position L2 may be changed to a position farther away from the position being the distance equal to twice the axial thickness of the third terminal portion 134 away from the first position L1 to the outer side in the first direction.

For example, the outer end of the solder 15 in the first direction may be arranged on the outer side of the outer end of the third terminal portion 134 in the first direction and at such a position that a distance D between the outer end of the solder 15 and the outer end of the third terminal portion 134 in the first direction satisfies the following inequality (1):

$$0 \text{ mm} \leq D \leq 0.3 \text{ mm}. \tag{1}$$

The axial thickness of the third terminal portion 134 is preferably about 0.1 mm. Note that the configuration that satisfies inequality (1) may be applied to an example embodiment of the present disclosure in which the above-described gap S is not defined. In addition, the outer end of the land 12a in the first direction may be arranged on the outer side of the outer end of the third terminal portion 134 in the first direction and at such a position that a distance D between the outer end of the land 12a and the outer end of the third terminal portion 134 in the first direction satisfies inequality (1).

The above arrangements contribute to preventing the solder 15 from excessively protruding to the outer side in the first direction from the third terminal portion 134, and preventing the central portion CR2 of the solder 15 from being significantly displaced in the first direction from the central portion CR1 of the region over which the third terminal portion 134 is in contact with the solder 15. That is, the above arrangements contribute to preventing the third terminal portion 134 from moving due to the surface tension when the solder has been melted. In addition, the above arrangements contribute to preventing the dimension of the solder 15 measured in the first direction from becoming too small, and allow the third terminal portion 134 to be firmly fixed.

Figure 8:
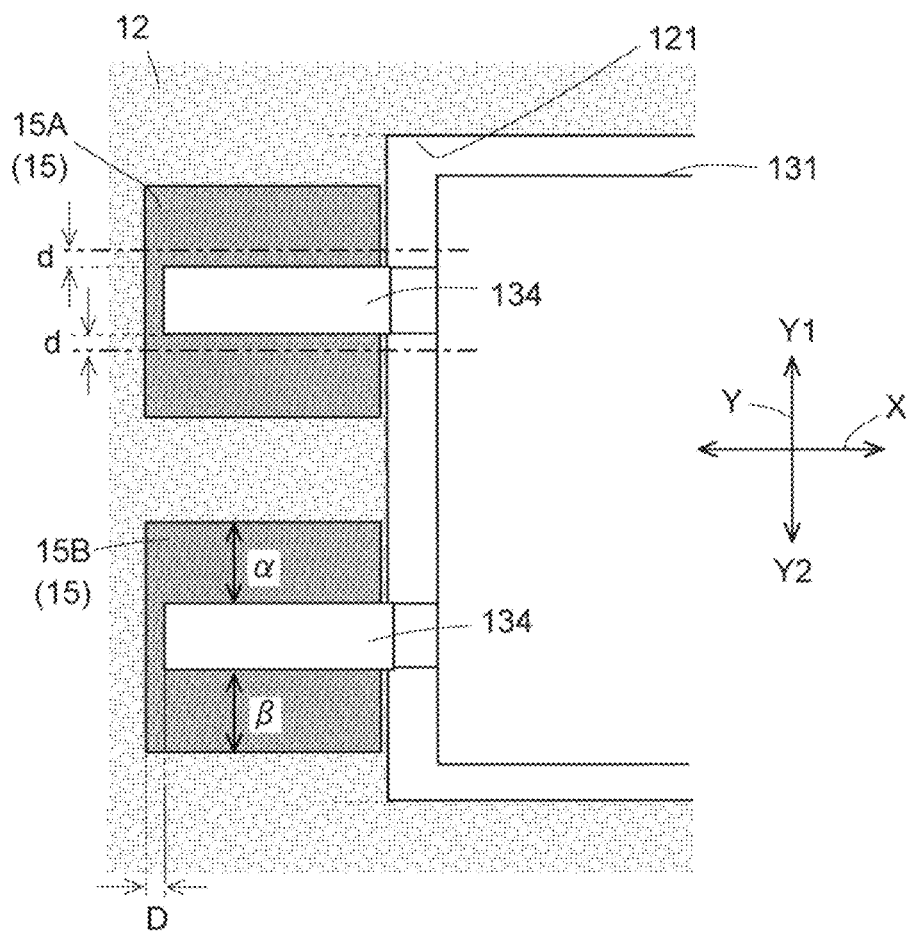
FIG. 8 is a schematic plan view illustrating the relationship between the solder and the third terminal portion in the motor according to an example embodiment of the present disclosure.

FIG. 8 is a schematic plan view illustrating the relationship between the solder 15 and the third terminal portion 134 in the motor 100 according to an example embodiment of the present disclosure. FIG. 8 is a plan view illustrating a portion of the lower surface of the circuit board 12. As illustrated in FIG. 8, at the lower surface of the circuit board 12, the third terminal portion 134 is arranged to extend in the second direction, which is perpendicular to both the first direction and the axial direction. In the following description of FIG. 8, it is assumed that sides indicated by reference symbol "Y1" and reference symbol "Y2" are a first side and a second side, respectively, in the second direction.

As illustrated in FIG. 8, a first end and a second end of the solder 15 in the second direction are preferably arranged outside of the third terminal portion 134 in the second direction. The first end and the second end of the solder 15 in the second direction protrude to opposite sides in the second direction. The first end of the solder 15 in the second direction protrudes to the first side in the second direction. The second end of the solder 15 in the second direction protrudes to the second side in the second direction. The first end of the solder 15 in the second direction is preferably arranged at a position away in the second direction from a first end of the third terminal portion 134 in the second direction by a distance equal to or greater than the axial thickness d of the third terminal portion 134. The second end of the solder 15 in the second direction is preferably arranged at a position away in the second direction from a second end of the third terminal portion 134 in the second direction by a distance equal to or greater than the axial thickness d of the third terminal portion 134.

A first end and a second end of the land 12a in the second direction are preferably arranged outside of the third terminal portion 134 in the second direction. The first end of the land 12a in the second direction is preferably arranged at a position away to the first side in the second direction from the first end of the third terminal portion 134 in the second direction by a distance equal to or greater than the axial thickness d of the third terminal portion 134. The second end of the land 12a in the second direction is preferably arranged at a position away to the second side in the second direction from the second end of the third terminal portion 134 in the second direction by a distance equal to or greater than the axial thickness d of the third terminal portion 134.

As illustrated in FIG. 8, it is preferable that the distance α by which the first end of the solder 15 in the second direction is away in the second direction from the first end of the third terminal portion 134 in the second direction is equivalent to the distance β by which the second end of the solder 15 in the second direction is away in the second direction from the second end of the third terminal portion 134 in the second direction. It is preferable that the distance by which the first end of the land 12a in the second direction is away in the second direction from the first end of the third terminal portion 134 in the second direction is equivalent to the distance by which the second end of the solder 15 in the second direction is away in the second direction from the second end of the third terminal portion 134 in the second direction.

The above arrangements contribute to preventing the central portion CR2 of the solder 15 from being displaced in the second direction from the central portion CR1 of the region over which the third terminal portion 134 is in contact with the solder 15. That is, the above arrangements contribute to preventing the third terminal portion 134 from moving due to the surface tension when the solder has been melted. The above arrangements contribute to preventing the dimension of the solder 15 measured in the second direction from becoming too small, and allow the third terminal portion 134 to be firmly fixed with a fillet being defined.

As illustrated in FIG. 8, it is preferable that, in the second direction, the first end and the second end of the solder 15 in the second direction are arranged between a first end and a second end of the board hole 121 in the second direction. In the present example embodiment, two of the solders 15 are arranged apart from each other in the second direction. A first end of one of the two solders 15, a solder 15A, in the second direction is arranged on the second side in the second direction of the first end of the board hole 121 in the second direction. A second end of another one of the two solders 15, a solder 15B, in the second direction is arranged on the first side in the second direction of the second end of the board hole 121 in the second direction. It is more preferable that, in the second direction, the first end and the second end of the solder 15 in the second direction are arranged between both ends of the component body portion 131 in the second direction. The above arrangements contribute to preventing the dimension of the solder 15 measured in the second direction from becoming too large, and preventing the distance between the terminals 135 arranged in the second direction from becoming too large.

It is preferable that, in the second direction, the first end and the second end of the land 12a in the second direction are arranged between the first end and the second end of the board hole 121 in the second direction. It is more preferable that, in the second direction, the first end and the second end of the land 12a in the second direction are arranged between both ends of the component body portion 131 in the second direction.

In the present example embodiment, the distance D between the outer end of the third terminal portion 134 in the first direction and the outer end of the solder 15 in the first direction is smaller than each of the distance α and the distance β.

The above arrangement contributes to preventing the solder 15 from excessively protruding to the outer side in the first direction from the third terminal portion 134, and preventing the central portion CR2 of the solder 15 from being significantly displaced in the first direction from the central portion CR1 of the region over which the third terminal portion 134 is in contact with the solder 15. That is, the above arrangement contributes to preventing the third terminal portion 134 from moving due to the surface tension when the solder has been melted. In addition, the above arrangement contributes to preventing the dimension of the solder 15 measured in the second direction from becoming too small, and allows the third terminal portion 134 to be firmly fixed with a fillet being defined.

Example embodiments of the present disclosure are applicable to, for example, motors for use in a household electrical appliance, an office automation appliance, an in-vehicle device, and so on.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a stationary portion including an annular stator centered on a central axis extending in a vertical direction; and
   a rotating portion including a magnet radially opposite to the stator, and rotatable about the central axis; wherein
   the stationary portion includes:
      a circuit board axially below the magnet, and including a board hole passing therethrough in an axial direction; and
      an electronic component mounted on the circuit board;
   the electronic component includes:
      a component body portion including at least a portion thereof in the board hole;
      a first terminal portion extending in a first direction from the component body portion, the first direction being not parallel to the axial direction;
      a second terminal portion extending downward from the first terminal portion; and
      a third terminal portion extending in the first direction from the second terminal portion, and joined to a lower surface of the circuit board through solder;
   at the lower surface of the circuit board, the third terminal portion extends from an inner side to an outer side in the first direction, the inner side being a side closer to the component body portion, the outer side being a side opposite to the inner side; and
   an outer end of the solder in the first direction is on the outer side of an outer end of the third terminal portion in the first direction and at a position such that a distance D between the outer end of the solder and the outer end of the third terminal portion in the first direction satisfies about 0 mm≤D≤about 0.3 mm.

2. The motor according to claim 1, wherein the circuit board is a single-sided mounted board, including a circuit pattern on the lower surface.

3. The motor according to claim 1, wherein
the board hole is axially under the magnet; and
the component body portion includes:
a sensor portion; and
a resin portion covering the sensor portion.

4. The motor according to claim 1, wherein the first terminal portion extends in the first direction from an axial middle position of the component body portion or a position axially above the axial middle position.

5. The motor according to claim 1, wherein
at the lower surface of the circuit board, the third terminal portion extends from an inner side to an outer side in the first direction, the inner side being a side adjacent to the component body portion, the outer side being a side opposite to the inner side; and
an outer end of the solder in the first direction is at one of the following positions:
a first position at which an outer end of the third terminal portion in the first direction is provided;
a second position being a distance equal or substantially equal to twice an axial thickness of the third terminal portion at a position spaced away from the first position to the outer side in the first direction; and
a position between the first position and the second position in the first direction.

6. The motor according to claim 1, wherein
at the lower surface of the circuit board, the third terminal portion extends in a second direction perpendicular or substantially perpendicular to both the first direction and the axial direction;
a first end and a second end of the solder in the second direction are outside of the third terminal portion in the second direction;
the first end of the solder in the second direction is located at a position in the second direction spaced away from a first end of the third terminal portion in the second direction at a distance equal to or greater than an axial thickness of the third terminal portion;
the second end of the solder in the second direction is located at a position in the second direction spaced away from a second end of the third terminal portion in the second direction at a distance equal to or greater than the axial thickness of the third terminal portion; and
the distance by which the first end of the solder in the second direction is spaced away in the second direction from the first end of the third terminal portion in the second direction is equivalent to the distance by which the second end of the solder in the second direction is spaced away in the second direction from the second end of the third terminal portion in the second direction.

7. The motor according to claim 6, wherein, in the second direction, the first end and the second end of the solder in the second direction are between two ends of the board hole in the second direction.

8. The motor according to claim 1, wherein a central portion of a region over which the third terminal portion is in contact with the solder coincides with a central portion of the solder, or is adjacent to the central portion of the solder.

* * * * *